United States Patent
Schuyler

(10) Patent No.: US 7,577,581 B1
(45) Date of Patent: Aug. 18, 2009

(54) METHOD FOR TARGETING PROMOTIONS TO INDIVIDUAL ASSOCIATED WITH A VEHICLE

(75) Inventor: Marc P. Schuyler, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2205 days.

(21) Appl. No.: 09/703,459

(22) Filed: Oct. 31, 2000

(51) Int. Cl.
*G06Q 30/00* (2006.01)
*G01M 17/00* (2006.01)

(52) U.S. Cl. .............................. 705/14; 705/26; 701/29; 701/32

(58) Field of Classification Search .................... 705/14, 705/26; 701/29, 32
See application file for complete search history.

(56) References Cited

U.S. PATENT DOCUMENTS

| | | | |
|---|---|---|---|
| 4,512,442 A * | 4/1985 | Moore et al. ................. | 187/393 |
| 4,723,212 A | 2/1988 | Mindrum ..................... | 364/401 |
| 4,910,672 A | 3/1990 | Off ............................. | 364/405 |
| 5,173,851 A | 12/1992 | Off et al. .................... | 364/401 |
| 5,214,582 A | 5/1993 | Gray ..................... | 364/424.03 |
| 5,491,418 A | 2/1996 | Alfaro ........................ | 324/402 |
| 5,612,868 A | 3/1997 | Off et al. .................... | 364/214 |
| 5,627,549 A * | 5/1997 | Park ............................ | 701/300 |
| 5,642,284 A | 6/1997 | Parupalli et al. ....... | 364/242.035 |
| 5,757,645 A | 5/1998 | Schneider ................... | 364/424 |
| 5,781,871 A * | 7/1998 | Mezger et al. .............. | 455/424 |
| 5,787,367 A | 7/1998 | Berra ............................ | 701/1 |
| 5,832,457 A | 11/1998 | O'brien et al. ................ | 705/14 |
| 5,844,473 A | 12/1998 | Kauman ...................... | 340/439 |
| 5,917,405 A | 6/1999 | Joao ............................ | 340/426 |
| 5,931,878 A | 8/1999 | Chapin, Jr. ................... | 701/30 |
| 5,942,986 A | 8/1999 | Shabot et al. .......... | 340/825.44 |
| 6,009,355 A | 12/1999 | Obradovich et al. ........... | 701/1 |
| 6,073,062 A | 6/2000 | Hashino ........................ | 701/3 |
| 6,150,925 A | 11/2000 | Casazza ................... | 340/425.5 |
| 6,169,943 B1 | 1/2001 | Simon et al. .................. | 701/29 |
| 6,246,935 B1 | 6/2001 | Buckley ..................... | 701/36 |
| 6,259,362 B1 | 7/2001 | Lin ............................. | 340/457 |

FOREIGN PATENT DOCUMENTS

WO    WO 97/23838    *    7/1997

OTHER PUBLICATIONS

Grant Yoxon, "High-tech maintenance log keeps driver on the ball" Ottawa Citizen, Final ED, p. C9: Friday Jul. 28, 2000.*

* cited by examiner

*Primary Examiner*—Jean D. Janvier

(57) ABSTRACT

This disclosure provides a system for remotely communicating with a vehicle and a related business method of targeting promotions to one or more individuals associated with a vehicle. The system includes a wireless device, a security gateway, and an on-board computer coupled to one or more sensors or controls. The wireless device permits reporting of a maintenance event to a central source (e.g., a dealer, manufacturer or their delegee) or to a promoter that can target promotions based on the particular maintenance event. Preferably, the vehicle is equipped with software that automatically and unsolicitedly identifies maintenance event and notifies the dealer, manufacturer, delegee or a promoter. It is this third party that then notifies the vehicle owner (or other individual associated with a vehicle identification number) of the maintenance event, that identifies local product or service providers in the individual's vicinity, and that provides targeted promotions to the individual.

11 Claims, 4 Drawing Sheets

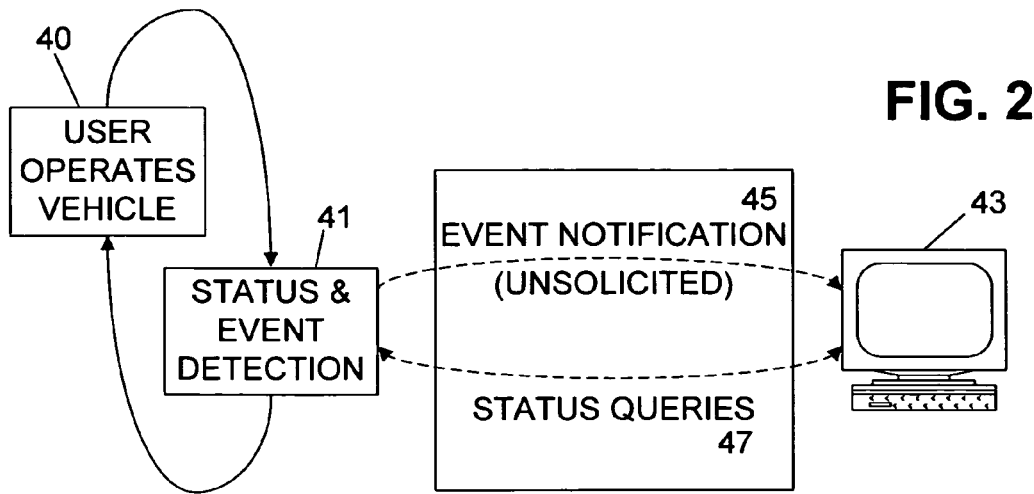
FIG. 2
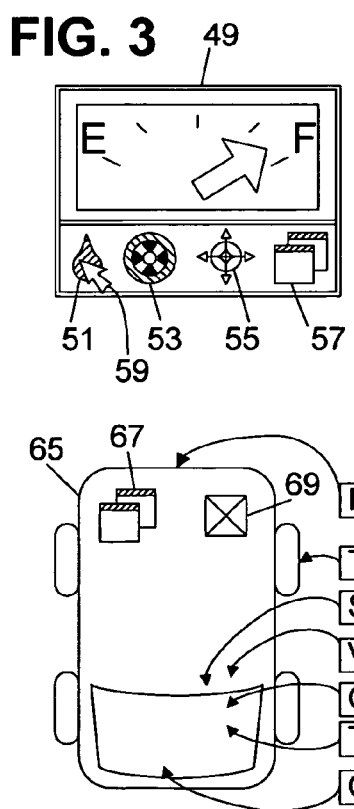
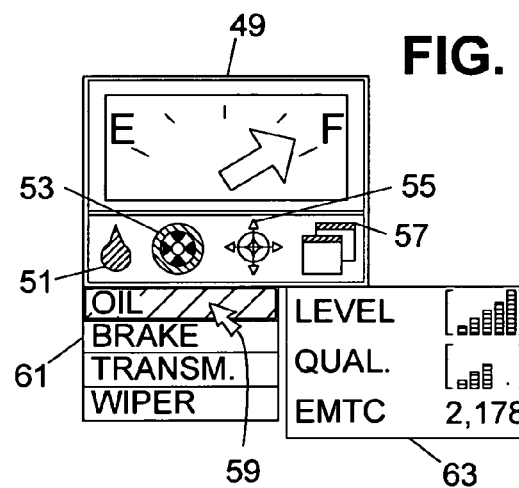
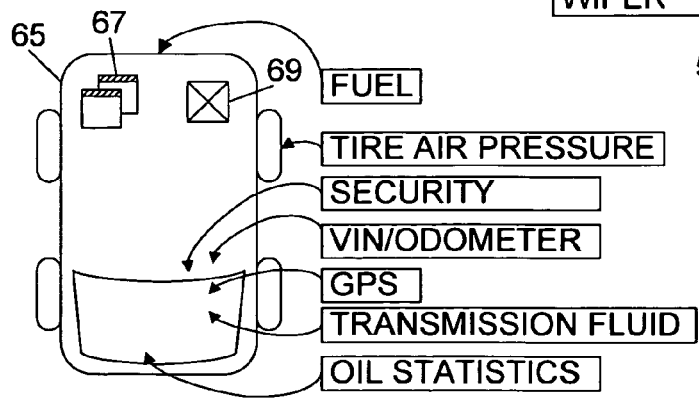

METHOD FOR TARGETING PROMOTIONS TO INDIVIDUAL ASSOCIATED WITH A VEHICLE

The present invention relates to systems that are used to collect data on vehicle status or to control specific vehicle functions. More particularly, the present invention provides a method for targeting promotions to one or more individuals associated with a vehicle.

BACKGROUND

Periodic maintenance and inspection of vehicles are generally considered essential for proper and safe operation and longevity of those vehicles. Relatively recently, vehicle manufacturers have incorporated various types of digital systems into vehicles, for example, on-board computers that monitor vehicle sensors in the engine. The sensors may be sophisticated sensors, for example, oil sensors which actually sense oil degradation. The computers perform various tasks with the aid of the sensors, for example, controlling vehicle alarm systems and driver dashboard components, monitoring the vehicle sensors and diagnosing faults. Using sophisticated sensors such as for example oil degradation sensors, these computers can actually estimate when service is actually needed (thereby potentially relieving a vehicle from the requirement of prophylactic service, e.g., oil changes every six thousand miles irrespective of degradation). Some vehicles have protocols by which diagnosed conditions may be reported to a garage or service entity having special equipment for reading those protocols.

Unfortunately, there are few if any systems for enabling a common consumer to automatically interrogate vehicle status. Even for vehicle owners sophisticated enough to learn about their vehicle and perform routine maintenance, typically such owners are at the mercy of garage owners and vehicle dealers for the diagnosis of more complicated conditions and maintenance. Further still, many vehicle owners have neither the time nor the expertise to reliable perform routine maintenance or detect conditions which require prompt service.

Even assuming that such a system existed, the preference of many consumers is to have others interpret vehicle conditions. That is to say, some vehicle owners are almost indifferent to the status of their vehicle, and rely on professionals to spot problems or diagnose vehicle maintenance conditions.

It would be useful to have a system that permits reporting of a maintenance condition to a vehicle owner. Further still, it would be useful to have a system that notifies a vehicle owner not only of a maintenance condition, but of the name or address of a local garage or dealer that can service the particular maintenance condition. Since the provision and maintenance of such information to the vehicle owner would be expected to have some associated expense, a need exists for a method of meeting that expense, such that vehicle owners do not have to pay extra for such a service. The present invention satisfies these needs and provides further related advantages.

SUMMARY

The present invention solves the foregoing needs using a system that permits wireless inspection of a vehicle. Ideally configured to be accessible through the world wide web, this system permits a vehicle owner at-work or at-home to connect to the vehicle via wireless communication and perform tasks such as inspecting vehicle status or writing parameters to control vehicle functions. Preferably also, a vehicle on-board system supports automatic maintenance event detection such as the need for an oil change or other, more complicated maintenance events. By remotely maintaining a database of addresses one or more individuals associated with vehicle and by implementing a targeted promotions program, a vehicle manufacturer, dealer or other promoter can inform individuals of maintenance events, as well as of the addresses of service or product providers in the individuals' geographic vicinity. Marketing fees may be collected directly from service or product providers who wish to sell their services or products. As should be apparent from the foregoing, the present invention provides a system that greatly facilitates remote vehicle inspection and control by a vehicle owner, whether the owner is an individual consumer having a single car, or whether the owner is a large entity possessing an entire fleet of commercial vehicles.

One form of the invention provides a method of targeting promotions to an individual associated with a vehicle, where the vehicle includes an on-board system having sensors from which a maintenance event can be detected. The method includes detecting a vehicle maintenance event by digitally interrogating the on-board system and identifying whether the vehicle maintenance condition meets predetermined maintenance criteria. If a maintenance event is detected, an identication of that event is wirelessly transmitted to a remote computer. The method also includes generating a promotion associated with the vehicle maintenance event and providing the promotion to the individual associated with the particular vehicle. To target the promotion, the party receiving the identication can store an association between the individual and the particular vehicle (e.g., in a computer database, indexed by vehicle identification number) and use vehicle identification to associate the vehicle maintenance event with the individual and responsively route event notification to that individual (e.g., using postal or email address). Using this information, the promotion is then sent to the individual.

In more detailed aspects of this form of the invention, event detection is automated using on-board software or firmware (these two terms will be used interchangeably herein) as is automatic, unsolicited connection via wireless communication with a vehicle manufacturer or dealer, or another promoter (e.g., a web based promotions service).

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve as a particular example thereof.

BRIEF DESCRIPTION OF THE DRAWINGS

FIG. 2 is a flow diagram illustrating both selective owner-initiated status checks of the vehicle and automatic event detection software; this software can include instructions that cause the vehicle to unsolicitedly contact the owner, or to generate maintenance messages for the vehicle owner or (selectively) for third parties.

FIG. 3 is an illustration of a hypothetical skin that could be downloaded to provide selective graphical interface between a vehicle and its owner, tailored to the level of owner sophistication.

FIG. 4 illustrates the skin of FIG. 3, where a submenu icon appearing on a user's web browser has been selected using a cursor.

FIG. 5 illustrates a second skin, providing slightly more status functions than the skin of FIGS. 3 and 4.

DETAILED DESCRIPTION

Figure 1:
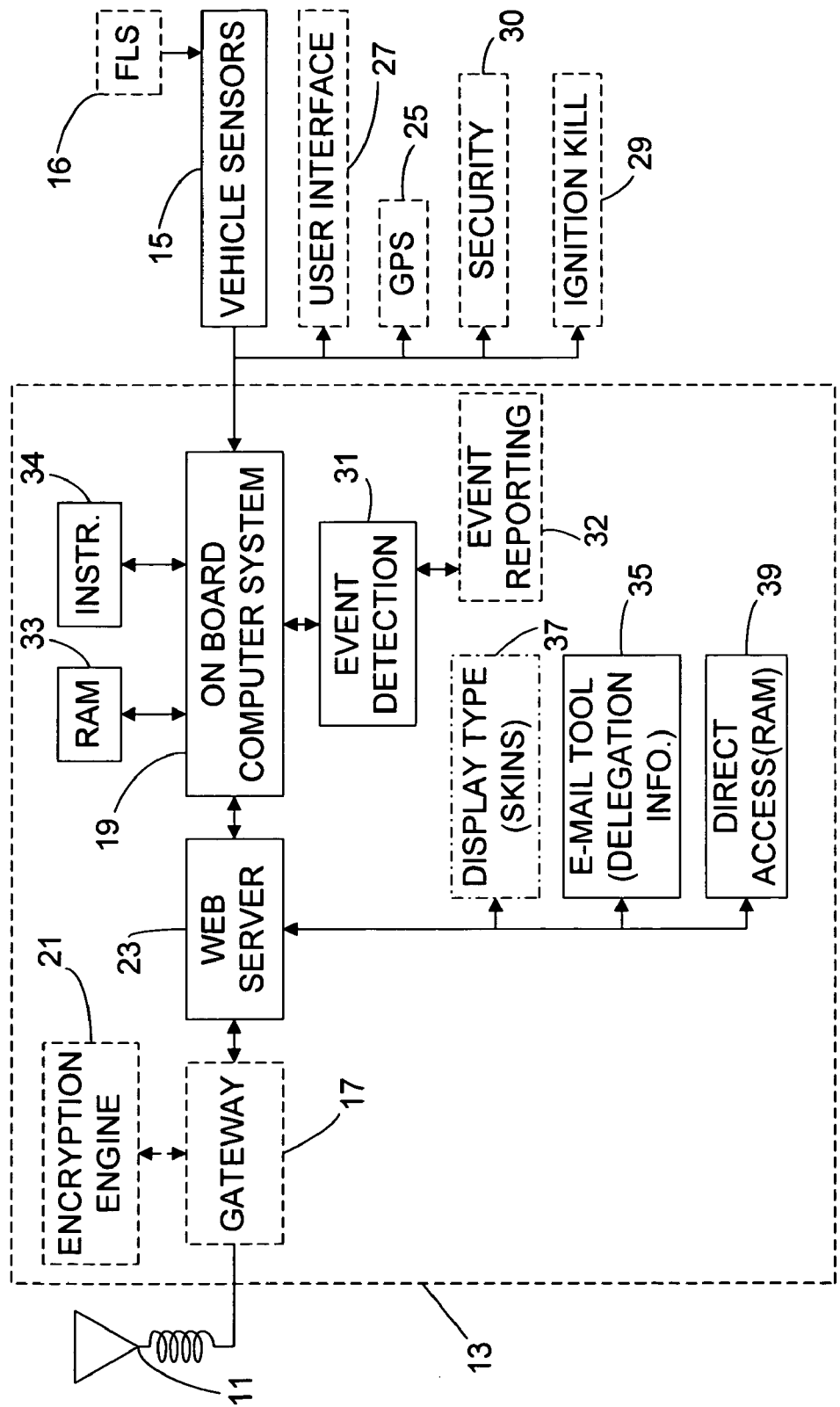
FIG. 1 is a block diagram showing implementation of a system for remotely communicating with a vehicle, including a wireless communication device, a set of on-board elements such as an on-board computer and associated sensors and controls, and a user interface for connecting the vehicle with a remote individual.

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the preferred specific implementation of a business method for targeting promotions to an individual associated with a vehicle, namely one that uses a system that permits remote communication with a vehicle through the use of a vehicle resident web system and a wireless device. The invention, however, may also be applied to other types of systems as well.

I. The Principal Parts

The preferred embodiment is a business method for targeting promotions to an individual associated with a vehicle. Preferably, this method uses an electronic system built into vehicle that permits the wireless interrogation of vehicle status or the wireless automated reporting of vehicle maintenance events. Prior to discussing the preferred business method, however, specifics about this on-board electronic system will first be described, as well as alternative configurations of a wireless device for vehicle communications.

The preferred electronic system preferably permits remote communication with a vehicle with a digital device with Internet access. New automobiles are designed to have onboard computer systems, a vast array of sensors for detecting many aspects of vehicle status and operation (including data relating to minutia of internal engine characteristics), global positioning system ("G.P.S.") capabilities, ignition kill in the event of theft or other security features such as a car alarm, visual electronic map displays, and similar types of sensors or controls. To report status of these systems, the preferred embodiment uses a wireless communication device which ideally is built directly by a manufacturer into an automobile or other vehicle.

In a simple form, the device could be a cell phone, or it could be a more sophisticated communication device that ideally permits communication over a relatively large distance (e.g., a few hundred yards to many miles). If a vehicle does not come inherently equipped with such a device, then as an alternative, the vehicle manufacturer builds a data port directly into the vehicle to which an owner may attach a common communication device such as a cell phone. Ideally, the on-board computer system for the vehicle in this event includes control instructions that cause the device to hang-up if left hanging, or to call specified locations upon the occurrence of specified events; more detail will be provided further below about event detection and a business method for collecting maintenance events and issuing discounts thereon.

The communication device is coupled to an optional digital electronic system that performs security screening. While such a security system might not be needed where a vehicle permits remote reading only of vehicle status, such a security system is preferred as in the preferred embodiment the remote communication system may be used both to interrogate vehicle status and to control certain vehicle functions, especially including security functions. Since such remote control potentially could afford individuals besides the vehicle owner the opportunity to contact a vehicle and change security settings, it is preferred to utilize security screening to ensure that only authorized individuals (the owner and any individuals delegated by the owner) remotely access the vehicle's on-board computer system. The security system is preferably implemented as a multiple tier system, including as a gateway that regulates remote wireless access to the vehicle to require special security tokens (such as asymmetric key authentication, two factor or greater password access, or some other form of security access), as well as one or more failsafe tiers that may be used by car dealers or the vehicle owner in the event of system error or failure, or the event that the owner loses passwords or security tokens. Preferably, such failsafe tiers are implemented via a special digital key that can be provided by a vehicle dealer to a vehicle owner in the event the owner forgets his or her password, as well as by a standard backup that permits only the owner to shut down security functions, e.g., a special procedure using a vehicle owner's ignition key.

FIGS. 1-5 are used to introduce a preferred on-board system for permitting remote communication with a vehicle.

FIG. 1, in particular, shows an overall system description, with optional features shown in dashed line form. As seen at the left side of FIG. 1, a communications device 11 is preferably coupled to a dashed line box 13 representing on-board vehicle functions which couple wireless communications to data provided by sensors 15, seen at the right-hand side of FIG. 1. The dashed line box includes a security gateway 17 that ensures that only authorized users are able to wirelessly write parameters to or retrieve information from a vehicle on-board computer system 19. The security gateway 17 also is preferably coupled to an encryption engine 21 for encryption of all wireless communications to protect those communications from interception.

Importantly also, FIG. 1 illustrates a box 23 labeled "web server." In a preferred embodiment, the vehicle is for convenience made accessible through the Internet. In this manner, an owner can check on multiple vehicle functions, e.g., gas level, oil condition, or any other functions desired simultaneously and from one position. That is to say, the owner can check on multiple vehicle functions without leaving a computer console or other common Internet interface, from the comfort of work or home. The conditions that the owner can check are determined based upon the vehicle sensors 15 or other information carried by the vehicle; for example, FIG. 1 indicates use of a fuel level sensor ("FLS") 16 to determine fuel remaining. To take another example, vehicles today do not typically carry automatic tire air pressure sensors, but if supported by a particular vehicle, the vehicle owner should be able to remotely and simultaneously check air pressure for all vehicle tires. In addition, some vehicles now support G.P.S. sensors, indicated by the reference numeral 25 in FIG. 1, or user interface functions 27 that might be viewable on a vehicle's dashboard such as accumulated mileage, temperature, facing direction, map and route calculation functions, even video capture. If supported by the particular vehicle, an owner preferably ought to be able to access information associated with these features, all through the preferred "web server" implementation of the present invention. FIG. 1 also illustrates an optional function 29 labeled "ignition kill." In the event of a vehicle theft (detected via absence of the vehicle or review of the G.P.S. sensors 25 or other vehicle information), this feature would permit a vehicle owner to remotely "turn off" the vehicle. If implemented, a specific bit would simply be written into a register of the on-board computer that would cause the computer, upon periodic sample, to initiate a vehicle shut-down (even if the vehicle is being driven). Since the safety and liability concerns of such an embodiment are unknown at the present time, this feature is not preferred at the present time and is identified as an option only. Irrespective of user-commanded ignition kill, a vehicle owner is preferably provided with security functions 30, potentially including remote ability to turn an alarm "on" or "off" or to turn a break-in triggered ignition kill "on" or "off."

FIG. 1 also illustrates several boxes associated with the on-board computer system 19 and the "web server" function 23. More specifically, the on-board computer system preferably includes an event detection function 31 and supporting random access memory ("RAM") 33 for storing sampled sensor values, miscellaneous computer software, and files downloaded and managed by the vehicle owner such as optional map files and skins. A box 35 labeled "email tool," a box 37 labeled "display type (skins)", and a box 39 labeled "direct access (RAM)" all represent functions that are preferably associated with the "web server" capabilities of the preferred on-board implementation.

FIG. 2 represents a flow diagram used to explain operation of the preferred digital system and the event detection function. More particularly, normal operation of the vehicle (represented by reference numeral 40 in FIG. 2) and status and event detection (represented by numeral 41 in FIG. 2) each occur independently of one another. A computer monitor 43 found at the right side of FIG. 2 is used to symbolize any remote communication with the vehicle, which may be initiated either by the owner in the form of status queries (represented by bidirectional communications arrows 45) or by the vehicle itself in the form of unsolicited event detection and notification 47. In this latter case, the vehicle may be provided with software that is periodically activated (e.g., either continuously looping software or a routine that activates weekly, monthly or at some other interval) to sample multiple vehicle sensors and report maintenance events or critical conditions. For example, a vehicle having an oil degradation sensor is preferably programmed to detect a maintenance event when oil degradation falls below a predetermined threshold; the software periodically samples the degradation sensor and compares read values against the threshold, initiating event reporting is the threshold is met. The software can also sample multiple sensors and perform complex analysis, for example, measuring (if supported by the sensors) several emissions or engine parameters and determining whether several parameters are simultaneously met. If an event is detected, software for the on-board vehicle computer system formats an email message to the owner reporting the maintenance event, and either actively initiates communication (e.g., automatically connects to an Internet service provider, or "ISP") or passively awaits for the next owner-initiated communication.

Importantly, further below, an optional business method is presented where special software can automatically report maintenance events to a third party such as a vehicle dealer, manufacturer or promoter, to trigger promotions such as discounted vehicle maintenance service. Additional details relating to event detection and software that detects maintenance or "critical events" can be obtained from U.S. Pat. No. 5,942,986, which is hereby incorporated by reference.

Returning to FIG. 1, it may be seen that an "email tool" 35 is associated with a web server function of the vehicle. If an event is detected, an informative text message is preferably formatted for the vehicle owner and either sent to a vehicle owner email address (one or more email notification addresses are preferably programmed into the vehicle at a configuration stage) or is retained in a message board that awaits next owner electronic access to the vehicle. The vehicle can be provided with software, such as event reporting instructions 32, to automatically and unsolicitedly activate the wireless device 11 to promptly report a maintenance event to a vehicle owner.

One preferred feature of a system for remotely communicating with a vehicle is the use of "skins," or customizable user interfaces that can be varied from operator to operator and can preferably be created and downloaded directly to the vehicle, such that an owner anywhere can access his or her vehicle using a preferred "skin." Since vehicle operators may have different levels of sophistication, e.g., some individuals accessing a vehicle may have the understanding of an experienced mechanic while other individuals may not understand how to physically check oil level, it is desired to provide a system that accommodates many different interfaces to make it easy for any vehicle owner to access required information, no matter what level of owner sophistication. To this effect, different skins will present different "controls" or parameters in differing graphical manners. For example, a skin used by an experienced mechanic may permit cursor selection (and retrieval) of engine timing parameters. Alternatively, for an unsophisticated user, a skin might have a simplified display directed to simple functions of checking oil, transmission fluid, air pressure, fuel remaining, and other basic queries related to vehicle maintenance. Since a nearly infinite number of possible graphical displays may be used, skins are preferably written in software by others, located through the Internet, and are made selectively downloadable to individual vehicles at the discretion of the vehicle owner, who can ideally write to on-board RAM 33 reserved for this purpose, with general computer file management capabilities (e.g., selective file deletion). As new skins become available, an owner may select new skins or remove old skins. Preferably, a default "full mode" display is supported by the vehicle "web server" such that a user can select functions not supported by a currently-active skin. To support the use of skins, vehicles' on-board computer systems preferably use a standard parameter naming function, e.g., "FR" for "fuel remaining", "LFAP" for "left front tire air pressure" of some other standard naming feature by which parameters may be readily found and organized by the skins. Importantly, another form of skins today are commonly used with computer music software, such as the "Real Jukebox" program, and design and implementation of a vehicle based system that can communicate with a vehicle's on-board computer or directly with sensors in accordance with the principles set forth herein is considered to be within the ordinary skill of one familiar with skins or computer programming.

Figure 6:
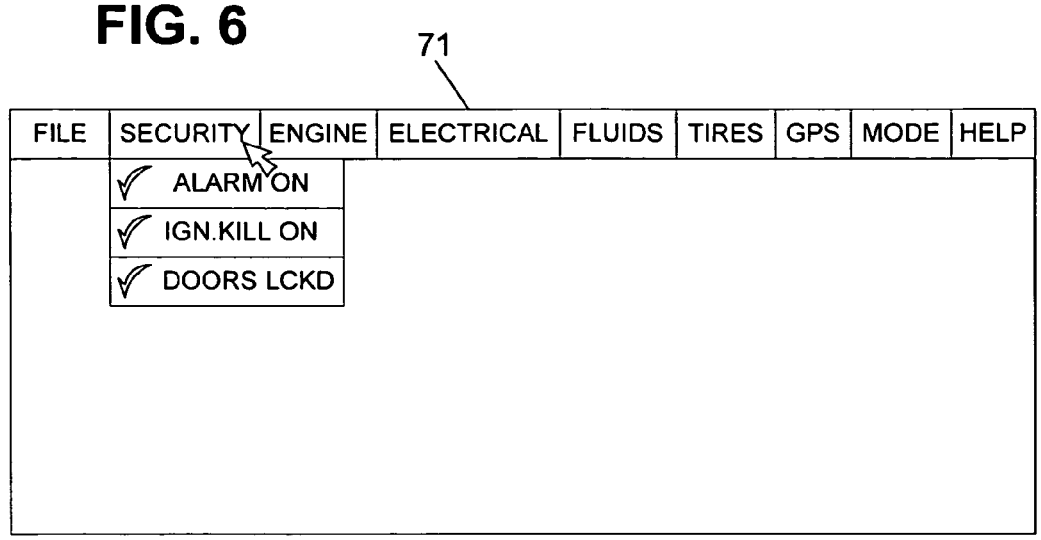
FIG. 6 illustrates a full graphical mode of a user interface used to remotely check vehicle status and controls.

FIGS. 3-5 present hypothetical examples of skins, whereas FIG. 6 shows a hypothetical full screen mode of a user interface.

One hypothetical skin 49 seen in FIG. 3 is directed toward a typical user who might typically desire to simply check fuel level, fluids, tires or G.P.S. While the preferred interface provides "full mode" access to a wide variety of controls and parameters, the hypothetical skin in FIG. 3 is directed toward an unsophisticated vehicle owner and might, for example, be used to occasionally check vehicle status at home or work. Individual icons 51, 53, 55 and 57 respectively depict a fluid drop, automobile tire, map symbol and full mode symbol for selective activation by a user using a standard web browser. The user simply moves a cursor 59 to overlap the desired icon and clicks a mouse or activates an "enter" button during such overlap. FIG. 3 also depicts a virtual fuel gauge 59 at the top of the figure, which is graphically updated to accurately depict fuel level as might be shown on the dashboard of a car.

FIG. 4 shows the skin 49 of FIG. 3, but where a user has "clicked" upon the fluid drop icon 51 using the cursor 59 to activate a pull-down menu 61. FIG. 4 indicates that this hypothetical skin permits four fluid sub-menu choices, including oil, brake, transmission and wiper fluid status. With the cursor 59 overlying the "oil" submenu choice, a further pull-down menu 63 is activated that graphically depicts oil level, oil quantity, and "EMTC" or "estimated miles until required oil change." It is expected that this latter feature will be supported by vehicles having new sensors which permit actual sampling of oil quantity and that, based upon these sensors and past history, software controlling the on-board vehicle computer will be capable of comparing actual oil quality to a threshold and rate of degradation in order to estimate how much farther the owner can drive the vehicle before an oil change is necessary. [Such instructions are designated in FIG. 1 using the reference numeral 34.]

FIG. 5 shows a second hypothetical skin 65 that graphically depicts a car and permits wireless access to a wide variety of features. For example, the hypothetical skin of FIG. 5 could permit a user to select any of fuel, tire air pressure, security, VIN/odometer, G.P.S., transmission fluid and oil statistics. In addition, a user is presented with buttons 67 and 69 to select either full mode or exit actions.

It should be emphasized that the aforementioned skins are hypothetical only and that, using simply software design utilities, individuals familiar with skins or with programming should be able to routinely design a wide variety of downloadable, graphical interfaces for use in connection with the preferred embodiment. A vehicle manufacturer could maintain a skin shareware site, at which skins written by individuals may be shared with other vehicle owners, to thereby facilitate easy remote access to a vehicle in a manner that suits any individual's sophistication and preferences.

FIG. 6 illustrates a hypothetical browser screen 71 representing a "full mode" of preferred software that provides a user interface between vehicle and a vehicle owner. In particular, the depiction of FIG. 6 is preferably a default view provided by software or firmware that may always be accessed from any skin and used to view all electronic status or control status that may be afforded by the car or system. As indicated in FIG. 6, a menu system is provided which may include various functions. A hypothetical menu tree that could be implemented as part of the user interface is provided in a table below.

TABLE 1

| Menu | Preferences | |
| --- | --- | --- |
| Security | Exit | |
| | Alarm On | |
| | Ignition Kill On | |
| | Doors Locked | |
| | Hood Closed | |
| | Trunk Closed | |
| Engine | Temperature | |
| | Timing | |
| | Type/Specs | |
| Electrical | Specs/Battery Type | |
| | Battery Level | |
| | Stereo | Type/Specs |
| | | CD |
| | | FM Presets |
| | | AM Presents |
| | Exterior Lights | |
| | Interior Lights | |
| Fluids | Wiper | |
| | Oil | Level |
| | | Quality |
| | | EMTC |
| | Transmission | Level |
| | | Quality |
| | Fuel | Level |
| | | Trip Set |
| | | Odometer |
| Tires | Left Front Air Pressure | |
| | Right Front Air Pressure | |
| | Left Rear Air Pressure | |
| | Right Rear Air Pressure | |
| Pos | G.P.S. | |
| | Direction | |
| | Speed | |
| | Camera On | |
| Mode | Select Active Skin | Current |
| | | Skin 1 |
| | | Skin 2 |
| | | Skin 3 |
| | Full Mode | |
| | Download Skin to Vehicle | Enter URL |
| Help | How to . . . | |
| | Find | |
| | Index | |

Importantly, the functions indicated above or other functions can be implemented as defined by the electronic sensors and functions supported by the particular vehicle.

II. Use of a Wireless Communication Device

Figure 7:
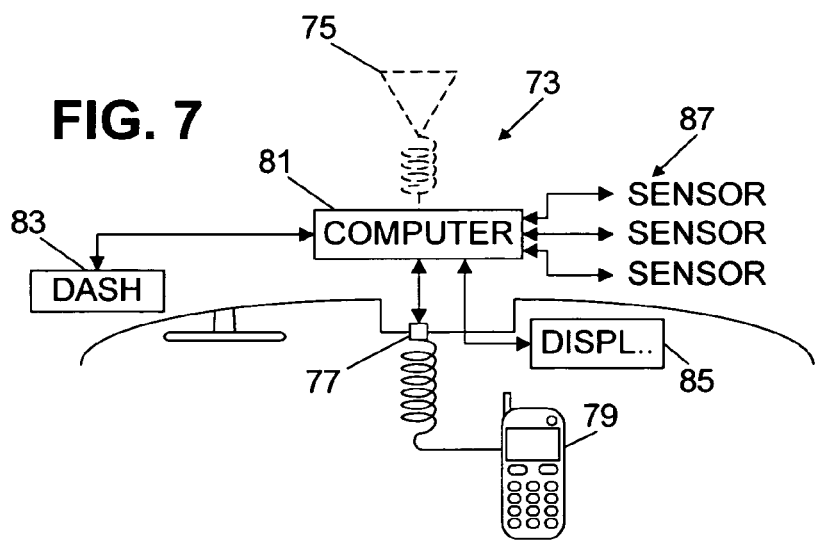
FIG. 7 is a layout illustrating the use of different wireless communication devices in the vehicle, specifically as either a device embedded in the vehicle during manufacture, or as a wireless device that is selectively electronically coupled to the vehicle using a port.

Importantly, as mentioned earlier, there are different possible forms for a wireless communication device that can be used to remotely couple a vehicle owner or other user to a vehicle's electronic sensors and controls. FIG. 7 illustrates one configuration 73 for a vehicle where, as with the preferred embodiment, a wireless communication system 75 such as a cell phone is embedded directly into the vehicle (e.g., beneath a hood of the vehicle) during manufacture. If such a device is only considered optional by the vehicle manufacturer, a port 77 may also be provided for vehicle owners to directly plug in a portable cell phone 79. In such an embodiment, the port preferably provides power and electrical communication between a vehicle's on-board computer system 81 and the portable cell phone 79. In this embodiment, the cell phone is preferably left "on" when electrically coupled to the vehicle, and the vehicle owner may while at a remote location directly dial (or use the Internet to contact) his or her cell phone to establish wireless contact with the vehicle. Preferably, the on board computer system 81 includes all software necessary to automatically answer the phone, provide gateway functions (of access control), server and ISP-like functions, and to format and respond to electronic signals sent over the phone. As indicated in FIG. 7, the computer may be used to couple the remote user not only with the computer itself, but with functions (or data) provided by an in-vehicle electronic dashboard gauge set 83, a computer display 85 such as used for calculating directions or maps, and various vehicle controls and sensors 87.

Figure 8:
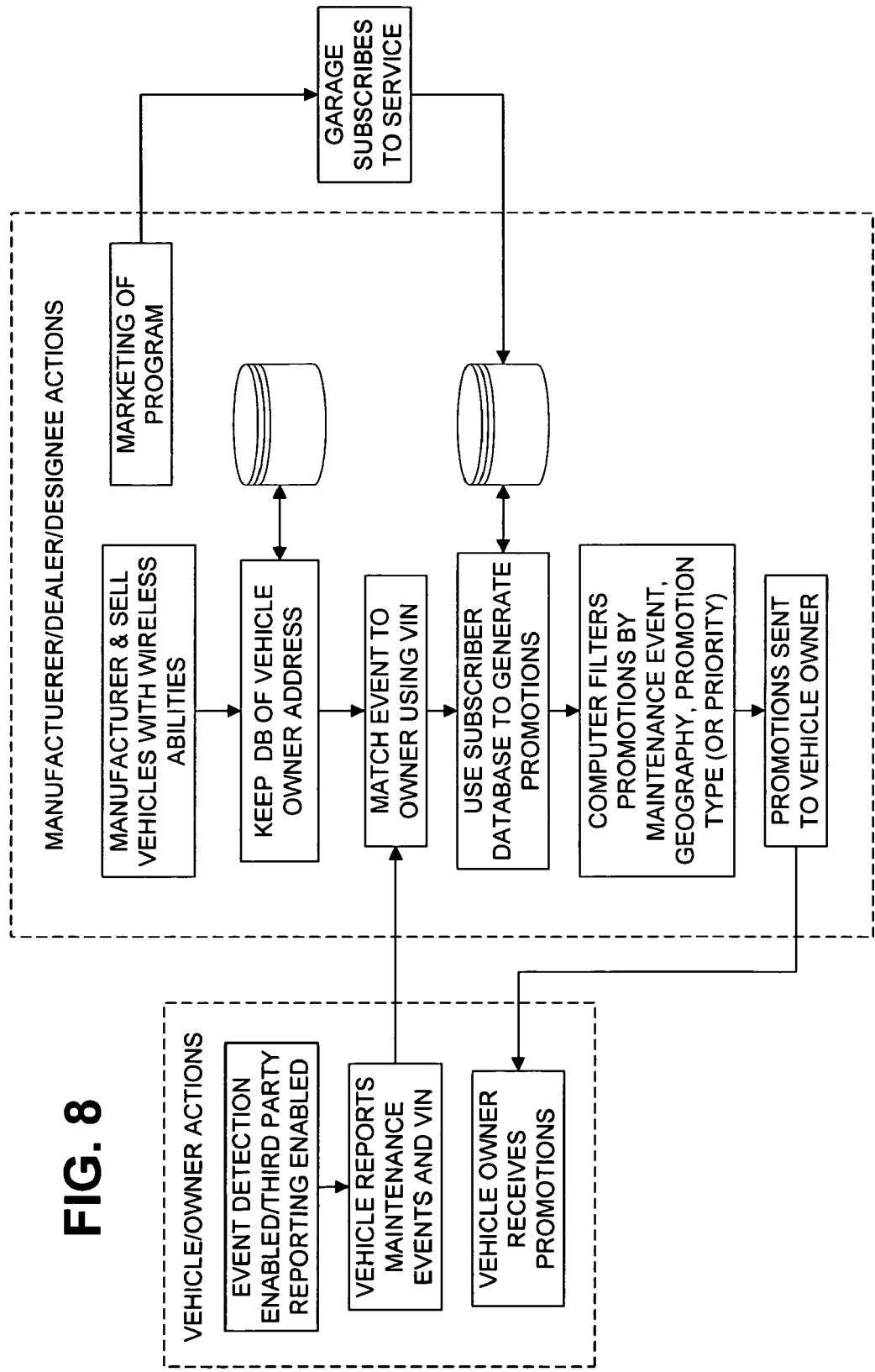
FIG. 8 is a flow diagram illustrating the operation of a business method for targeting promotions to vehicle owners.

III. Use of a Business Method to Generate Promotions Based Upon Event Reporting Automatic maintenance event detection was discussed earlier, in connection with FIGS. 1 and 2. If desired, a business method may be based around this event detection, as is now explained with reference to FIG. 8.

In particular, a vehicle manufacturer or dealer preferably installs in a large multitude of vehicles wireless communication systems, together with maintenance event detection software and software that causes the vehicle to initiate communications with a predetermined wireless destination. In addition, the vehicle manufacturer or dealer preferably also keeps a contact database (preferably including at least postal mailing address, and if desired, electronic mailing address as well) for a wide range of customers, indexed by vehicle identification number ("VIN"). Finally, the vehicle manufacturer or dealer, or an independent promoter, creates a program of selling targeted promotions to specific vehicle service providers.

When a maintenance event is detected by a particular vehicle, the vehicle itself preferably automatically and unsolicitedly contacts a predetermined third party wireless destination. For example, when the wireless link is effected by a cellular phone embedded within the vehicle, the vehicle uses a programmed number and predetermined protocol to report VIN and the detected maintenance event to a manufacturer, dealer or promoter. Preferably, a computer system of the manufacturer, dealer or promoter then accesses the contact database to obtain contact information for a vehicle owner. Finally, the manufacturer, dealer or promoter contacts the vehicle owner to inform the owner of the existence of the maintenance event and provides the vehicle owner with a targeted promotion that is based upon the maintenance event. As is known in the field of marketing, these promotions may include service discount coupons for a garage that performs the service in question, a garage that provides a complementary service, and other types of promotions as well, especially including product discounts, or a list of local service or providers who can assist with the particular maintenance event; preferably, these promotions can be based upon geographic location of the vehicle owner (e.g., especially in the case of maintenance services).

To take examples of a preferred marketing program and types of promotions that can be targeted, it should be assumed that a hypothetical vehicle owner lives in southern California, U.S.A., specifically in the city of Santa Monica. A vehicle manufacturer may offer to individual garages around the United States a program that directs vehicle owners to a garage within a short distance of the vehicle owner's residence. For example, for a small fee, a vehicle manufacturer, dealer or promoter could send out promotions for garages in Santa Monica and also garages located elsewhere, such as in the state of New York. Upon receiving maintenance event notification for the vehicle located in Santa Monica, the vehicle manufacturer, dealer or promoter could automatically send to the vehicle owner discount coupons for service by the garage in Santa Monica, using a filter that selects only those garages in the vehicle owner's vicinity. In this manner, the vehicle manufacturer or dealer would profit based upon fees collected from participating garages, the garages would profit based upon fees collected if the vehicle owner frequents the particular garage for service, and the vehicle owner would benefit based upon the event notification and the service discount offered. Promotions may also be based upon (and filtered based upon) service type, e.g., different coupons may be issued for oil change versus 100,000 mile service. Promotions may be based upon complimentary service, for example, a 100,000 mile service discount coupon offered to all owners of vehicles currently needing an oil change; alternatively, competitive promotions may also be issued, e.g., the vehicle manufacturer could send coupons or advertisements for competitive vehicle manufacturers in the event of a significant maintenance event. It should be seen from this description that promotional marketing using this alternative business method will be especially attractive to nationwide service providers, for example, to store chains that specialize in oil changes and have many locations, or to auto parts stores, which can cost effectively participate in such a promotions plan with coupons of some type being presented to nearly all participating vehicle owners, tailored to many types of maintenance events. The vehicle manufacturer, dealer or promoter might even be required to choose between alternate promotions, e.g., issuing a specific, complimentary coupon for oil purchase where multiple automotive oil manufacturers are participating in a manufacturer sponsored marketing promotions plan. It is expected that suitable computer programming to handle these contingencies (e.g., via concurrent, round robin or prioritized coupon distribution where multiple subscribers are contending for service) is well within the level of skill of one familiar with promotions or computer programming.

It should also be mentioned that, typically, it will be expected (pursuant to the preferred method) that promotions would be handled by a delegee of a vehicle manufacturer or dealer, such that maintenance event notification would typically be received by a manufacturer or dealer, transmitted to the delegee, and the delegee would then perform marketing of the promotions service to garages or maintenance product sellers and the actual targeting and mailing of promotions. As an alternative, in vehicles that have on-board passenger displays with web access, an independent promoter could be sporadically selected and contacted via the world wide web when a maintenance event occurs to provide a list of service providers in a local vicinity, together with promotions.

Preferably, if the vehicle is configured to unsolicitedly contact a particular manufacturer, dealer or promoter, the owner is given the option to disable such a marketing program, by programming a parameter into the vehicle's onboard computer that suspends event detection or reporting of events to a third party. Such programming is preferably accomplished using the "full mode" of the vehicle user interface, as has been described above, or a skin that supports this selection. These and other features of the optional promotions business method are variously indicated in FIG. 8.

IV. Other Embodiments

Importantly, there are many other embodiments which may be used to implement the principles of the present invention, whether or not expressly described herein. For example, it has already been mentioned that use of a security function that restricts wireless access to a vehicle is optional, or may be implemented in a different manner. In addition, the "gateway," "web server" and other functions may be (and typically will be) implemented by a single on-board vehicle computer system running suitable firmware or software. It is possible to go either through an ISP or a direct connection system, as has been alluded to above. Also, as web or Internet capabilities are expanded to other products, e.g., portable cell phones, watches or other products, it is expected that they too will have capabilities of wirelessly interfacing with a vehicle on-board system. It is possible and perhaps simpler to use skins on a vehicle owner's home computer (with an active skin transparently communicating with a vehicle), instead of providing software download to a vehicle; such an embodiment might not offer an owner the advantage of being able to use the same active skin from other computer's or remote connections, but it is an alternative embodiment that ostensibly utilizes the principles of the present invention. Also, in connection with the business method mentioned above, one could also individually poll a set of vehicles using a wireless system for remotely connecting to the vehicles as has been described, where the act of polling replaces event detection software, i.e., where a maintenance event is detected by a third party. All such modifications have not been incorporated into the preferred examples of the invention, but are viewed as contemplated extensions of the principles described above.

Having thus described several exemplary implementations of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

Having thus described several exemplary implementations of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

The invention claimed is:

1. A method of targeting promotions to an individual associated with a vehicle, where the vehicle includes an on-board system including vehicle sensors from which a maintenance event is to be detected, said method comprising:
   detecting a vehicle maintenance event, including
      digitally interrogating the on-board system of the vehicle,
      detecting when the vehicle maintenance condition meets predetermined maintenance criteria, and
      transmitting wirelessly to a remote computer an identification that the vehicle has met the predetermined maintenance criteria;
   generating a promotion associated with the vehicle maintenance event; and
   providing the promotion to the individual associated with the particular vehicle, including
      using an association between the individual and the vehicle to associate the vehicle maintenance event with the individual, and
      sending the promotion to the individual.

2. A method according to claim 1, wherein:
   interrogating the on-board system includes providing a vehicle having an on-board digital system having instructions stored therein operative to cause the digital system to unsolicitedly detect occurrence of the maintenance event; and
   said instructions further cause the on-board digital system and a wireless transmitter associated with the vehicle to unsolicitedly contact the remote computer and send the identification to the computer.

3. A method according to claim 1, wherein generating a promotion includes:
   obtaining service discount coupon permissions for a plurality of service providers, across multiple geographies;
   filtering the service providers based on type of vehicle maintenance service and geographic vicinity to the individual; and
   generating and transmitting at least one coupon to an address associated with the individual in response to the filtering.

4. A method according to claim 1, wherein generating a promotion includes:
   generating a discount coupon for a product that is complimentary to the vehicle maintenance event; and
   transmitting the coupon to an address associated with the individual.

5. A method according to claim 1, wherein generating a promotion includes:
   generating a discount coupon for a service that is complimentary to a service for the vehicle maintenance event; and
   transmitting the coupon to an address associated with the individual.

6. A method according to claim 1, wherein:
   transmitting to a remote computer includes transmitting the identification to a delegee of a vehicle manufacturer or dealer; and
   generating a promotion includes use of the identification by the delegee to generate a notification that a particular vehicle maintenance event has been reached, and mailing that notification to the individual pursuant to a vehicle sales promotion.

7. A method according to claim 1, wherein:
   the vehicle has an on-board computer system and a vehicle user display screen; and
   sending the promotion to the individual includes sending an electronic message to the on-board computer system for the vehicle which causes the computer system to visually display the promotion for the user.

8. A method according to claim 1, wherein:
   using an association includes storing contact information for the individual, including an email address associated with the individual; and
   sending the promotion to the individual includes sending an electronic message to the user's email address.

9. A method according to claim 1, wherein generating a promotion includes:
   generating a discount coupon for a product that is complimentary to a service for the vehicle maintenance event; and
   transmitting the coupon to an address associated with the individual.

10. A method according to claim 1, wherein using an association includes:
    collecting, at the time of vehicle purchase, a contact address for a vehicle purchaser, and storing the contact address in an electronic database.

11. A method according to claim 1, wherein using the association includes:

storing a vehicle identification number on-board the vehicle;

upon detection of a maintenance event, transmitting the vehicle identification number together with the identification sent to the remote computer; and associating contact information for the individual with a particular maintenance event using the vehicle identification number.

* * * * *